3,761,465
PREPARATION OF WATER-SOLUBLE DERIVATIVES OF CELLULOSE, AND COMPOSITIONS THEREOF
Clayton D. Callihan, 9524 Greenbriar Drive, Baton Rouge, La. 70815
No Drawing. Filed Sept. 30, 1971, Ser. No. 185,350
Int. Cl. C08b 11/00
U.S. Cl. 260—231
10 Claims

ABSTRACT OF THE DISCLOSURE

A process for the preparation of water-soluble cellulose derivatives, principally carboxy methyl cellulose, by reaction between partially hydrolyzed or solvated cellulose, by reaction between partially hydrolyzed or solvated cellulose and a monohaloacetonitrile. In a preferred reaction, e.g., monochloroacetonitrile is reacted with alkali cellulose at relatively low temperatures, with or without a carrier solvent, to obtain water-soluble cellulose derivatives, including particularly carboxy methyl cellulose and mixed ethers of carboxy methyl cellulose and carbamyl methyl cellulose.

The present invention is concerned with a process for the preparation of useful water-soluble derivatives of cellulose, including particularly the mixed ethers of carbamyl methyl cellulose and carboxy methyl cellulose, and to new and useful compositions of water-soluble cyano, amino and carboxyl derivatives of cellulose.

Cellulose, the major constituent of the vegetable kingdom, is a naturally-occurring, high molecular weight polymer which can be chemically modified to produce useful water-soluble derivatives, these being hydrophilic colloids that impart high viscosity to dilute solutions, and therefore possesses good suspending, thickening, stabilizing, and film-forming properties. The anionic character of the carboxyl group of the carboxy methyl cellulose, e.g., renders it particularly suitable as a soil-suspending agent for use in detergents. Sodium carboxy methyl cellulose is absorbed on cotton fibers by hydrogen bonding such that it repels charged dirt particles, and serves as an ion exchange agent to tie up calcium ions in hard water. Sizeable quantities are used in drilling muds to stabilize suspensions of heavy solid materials in water. It stabilizes emulsions, latexes and dispersions. Carboxy methyl celluloes, and water-soluble derivatives of cellulose, are useful as thickening agents in textile print pastes and in textile finishings and sizing. They have excellent film-forming properties and are also valuable in paper sizing and coating. Because carboxy methyl cellulose is physiologically inert, the pure form of cellulose gum is extensively useful in the food, pharmaceutical and cosmetic industries.

Cellulose, in its natural state, is a polysaccharide composed of a variable number of individual anhydroglucose units linked together through the 1 and 4 carbon atoms with a β-glucosidic linkage characterized by Haworth et al,. as follows:

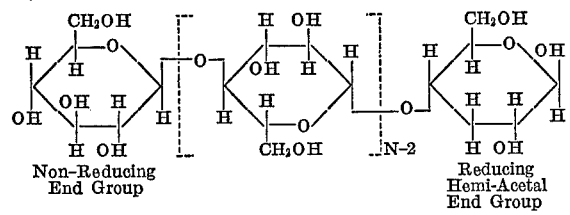

Non-Reducing End Group ... Reducing Hemi-Acetal End Group

[Haworth, W. N., Hirst, E. L., and Thomas, H. A., "Polysaccharides, Part VII," J. Chem. Soc. 824(1931)]. The hydroxy groups of cellulose are the primary reaction sites and, it will be noted, comprise, with the moieties to which they are associated, a primary alcohol attached to the number 6 carbon atom and secondary alcohols attached to the number 2 and 3 carbon atoms, these being sites which can react to form ethers of cellulose. The hydroxyl groups of a monomer unit (N-2), through the exertion of hydrogen bonding, cause considerable intermolecular attraction of the Van der Wall type between chains, thus lessening the reactivity normally expected of alcohols until such time as the cellulose has become solvated.

The number of monomer units in a single chain of cellulose can range from a few hundred, or less, to several thousand, e.g., 30 to 5000, or more. The structure of cellulose is basically crystalline in nature, partially due to the stiff glucosidic chains, the presence of the hydroxyl groups, and because of the length and flexibility of the chains which results in their entanglement. Some amorphous regions, however, do exist in the cellulose chain. Due to the intermolecular forces holding the molecules together, solvent penetration is more difficult than in lower molecular weight compounds. Techniques are known to the art for hydrolysis or solvation of cellulose, however, and after solvation the primary and secondary hydroxyl groups become accessible so that ethers can be formed. Chemically, after solvation of the cellulose, cellulose reacts basically in the same manner as primary and secondary alcohols. The average number of hydroxyl groups replaced, based on the three available hydroxyl groups per anhydrogluclose unit, determines the degree of substitution (D.S.) on the chain. A fully substituted cellulose derivative, e.g., would have a degree of substitution of 3.0 whereas a degree of substitution of 1.5 would mean that an average of one-half of the available hydroxyl reaction sites have been replaced while one-half remain as free hydroxyl groups. Substitution occurs most readily within the amorphous regions of the cellulose, and the degree of substitution has a marked effect on the solubility of the substituted cellulose; the more substituted the chain, the more soluble the substituted product or derivative up to a certain limiting number, above which the nature of the solubility changes such that very highly substituted products may not be soluble in water but may be soluble in organic solvents.

Strong bases can thus be used to partially solvate the natural cellulose, causing it to swell, thus allowing for easier penetration by reactants for formation of ethers. The swelling or etherifying agents disrupt hydrogen bonding and other secondary forces bonding the hydroxyl groups and thereby increases the uniformity of access so that the reactions can be caused to occur. Some common swelling agents are alkali metal hydroxides, e.g., the hydroxides of potassium, lithium, cesium, rubidium, and the like, liquid ammonia, trimethylsulfonium hydroxide, guanidinium hydroxide, cupraammonium hydroxide, trimethylbenzylaminoium hydroxide, and the like. Alkali or alkaline earth metal hydroxides are particular preferred. Concentrated aqueous sodium hydroxide solutions are especially preferred and are commonly used to effect such solvation because sodium hydroxide is low in cost and provides desired uniform product distribution with minimum degration.

The patent and technical literature discloses various methods for the preparation of ethers, including particularly carboxy methyl cellulose, from hydrolyzed or solvated alkali cellulose. For example, a known commercial method is to react sodium alkali cellulose with monochloroacetic acid or sodium monochloroacetate at substantially ambient temperatures to form carboxy methyl cellulose or sodium carboxy methyl cellulose. This process, however, leaves much to be desired inasmuch as completing undesirable by-products are produced in considerable quantities. Purification costs are thus quite high because the by-products, salts and glycols are water-soluble and difficult to remove. One method for removal of by-products requires repeated washes with mixtures of alcohol and water, large quantities of alcohol relative to water being required in the mixtures. The raw material cost is also quite high based on the monochloroacetic acid. This is because most of the monochloroacetic acid is produced in a liquid phase reaction between chlorine and glacial acetic acid in the presence of acetic anhydride and ferric chloride at temperatures ranging from about 100° C. to 110° C., the former acting as a catalyst and the latter as an inhibitor to suppress dichlorination. About 8 to 10 hours are required to produce monochloroacetic acid in a desired 95 to 98 percent yield. The dichlorinated impurities must be carefully separated through recrystallization and extraction operations since the close boiling points of the product and undesirable by-products prevent satisfactory separation by ordinary distillation.

It is also well known that cellulose ethers can be prepared by reaction between alkali cellulose and an appropriate alkyl halide. In the well known Willamson reaction, e.g., the methyl and ethyl ethers of cellulose have thus been produced by reacting sodium alkali cellulose with methyl chloride or ethyl chloride. Cyanoalkyl cellulose derivatives have also been prepared, e.g., as when acrylonitrile is reacted with alkali cellulose to form cyanoethyl cellulose, but usually when attempts are made to partially hydrolyze the cyanoalkyl cellulose derivatives to the amide or carboxy form this has led to the removal of a large portion of the substituted groups from the cellulose chains, and insufficient substitution has been obtained in such reactions to form water-soluble derivatives.

A new and more economical route to the production of water-soluble derivatives, particularly carboxy methyl cellulose, is therefore an urgent need in the art. New and novel mixtures of water-soluble cellulose derivatives whose viscosity can be altered at will for usages such as described are also needed.

Accordingly, it is the primary objective of the present invention to obviate these and other prior art deficiencies and to provide a new and novel process for the preparattion of water-soluble cellulose derivatives, including carboxy methyl cellulose.

A particular objective of this invention is to provide an attractive and economical process of the character described, starting with a relatively low cost reagent or material for reacting with or etherifying a hydrated or solvated alkali cellulose.

It is also an object to provide water-soluble mixtures of cellulose derivatives as new and novel compositions of matter.

These and other objects are accomplished in accordance with the present invention wherein a monohaloacetonitrile etherifying reagent is reacted at good efficiencies with an alkaline-treated hydrolyzed or solvated cellulose, at relatively low temperatures, either in the presence of a carrier solvent or with only the reagents present, if desired, to form water-soluble mixtures of cellulose derivatives, including carboxy methyl cellulose. Exemplary of etherifying reagents are monobromoacetonitrile, monofluoroacetonitrile, monoiodoacetonitrile and monochloroacetonitrile, the latter being especially preferred due in large part to its low cost effectiveness. Besides being less expensive, the chloride is a smaller molecule than the iodo and bromo compounds and can diffuse into the celluose much more rapidly, resulting in a much more rapid reaction with cellulose, with correspondingly less side reactions. In accordance with this process, cellulose can be hydrolyzed or solvated in situ in an initial step by reaction with an alkaline reactant and then further reacted with the monohaloacetonitrile. The nitrile can then be hydrolyzed or solvated with the alkaline reactant in situ during the cyanomethylation reaction with the monohaloacetonitrile, or partially hydrolyzed or solvated in situ with the alkaline reactant, such that further hydrolysis of the cyano group can be carried out after the substitution reaction is over. The former step is a preferred technique and offers advantages.

The alkaline reactant for hydrolyzing or solvating the celluose is an aqueous alkaline reagent or solution, preferably an alkali hydroxide, e.g., sodium hydroxide, in weight concentration in water ranging from about 10 percent to about 73 percent, and in mole ratios ranging from about 2 moles to about 15 moles per mole of cellulose; preferably from about 25 percent to about 50 percent, and preferably ranging from about 3 moles to about 7 moles per mole of cellulose. In a preferred technique for reacting the cellulose, the latter is contacted with the required monohalonitrile in an initial step prior to addition of the alkaline hydroxide and the cellulose is partially solvated by contact with the reagent, which is used in mole ratios ranging from about 2 moles to about 10 moles per mole of cellulose, and preferably from about 3 moles to about 6 moles, based on the amount of cellulose loaded into the reactor. The in situ solvation of the cellulose is effected at temperatures ranging from about —10° C. to about 70° C., preferably from about 10° C. to about 40° C., for a period of time ranging from about 1 hour to about 24 hours. In the subsequent step, the concentration of the alkali by weight is initially from about 10 percent to about 50 percent, and preferably from about 20 percent to about 30 percent for the first half of the caustic addition while, in the second stage, alkali is used in weight concentration ranging from about 30 percent to about 73 percent, preferably from 40 percent to about 60 percent.

The alkali is added as a water solution to the premixed cellulose and monhaloacetonitrile, and as the reaction proceeds the reaction mixture becomes more and more diluted with water. This is because water is formed as a product of the reaction and because water previously added with the alkali is released. The net effect of these two phenomena is thus to cause dilution of the last portions of the alkali added. Better efficiency of substitution is obtained, however, by not allowing the alkali concentration to become too low until the very end of the reaction, and hence a preferred technique of conducting the reaction is to add an initial portion of the alkali in the more dilute form while latter portions are correspondingly increased in concentration. For example, a preferred technique is to add the first half of the required alkali as a 25 percent solution of alkali in water while the second half is added as 50 percent solution of alkali in water, by weight. Alternatively, the reaction can be staged, e.g., the stages each containing three equal parts of cellulose, with the first stage using 25 wt. percent alkali, the second using 50 wt. percent alkali, and the third 73 wt. percent alkali to obtain better reaction efficiency.

In the etherifying reaction the temperature is maintained within a range of from about —10° C. to about 70° C., preferably 10° C. to about 40° C., for a period of time ranging from about 2 to about 10 hours. Pressure can be varied quite widely and generally has little effect; however, an inert blanket of nitrogen is usually maintained to prevent hydrolysis of the cellulose. On the other hand, the time required for the caustic addition is quite important to obtain optimum efficiency and uniformity of substitution. Generally, the time for the caustic addition can vary from about 1 to 10 hours but preferably ranges from about 1 to 5 hours. Longer periods lead to additional costs by tying up reaction equipment with no real increase in product value. After the alkali is all added, a time of about 15 minutes to about 2 hours is generally required to complete the reaction with the preferred time being about 30 minutes to about 1 hour. The final step is to neutralize the reaction product with any fluid proton donor such as hydrochloric acid, acetic acid, sulfuric acid, etc.

The amount of alkali necessary in conducting the etherifying reaction ranges from about 2 to about 15 moles, and preferably from about 3 moles to about 7 moles, per mole of cellulose used in the reaction. From about 2 moles to about 10 moles, and preferably from about 3 moles to about 6 moles, of the monohaloacetonitrile etherifying reagent are added per mole of cellulose to effect the cyanomethylation reaction. Water is maintained with the reaction mixture, as set by the concentration of the alkali and the extent of the reaction.

The advantages of carrying out the reactions taught in this application are several-fold. First, the viscosity of solutions made using this product can be varied over a wide range without resorting to the usual technique of changing the molecular weight of the polymer molecules. A first method is to control the ratio of amide moieties to carboxyl moieties in the final product which, in turn, determines the extent of interaction of the polymer chains. Two polymer molecules tied together through a strong secondary interaction very nearly doubles the solution viscosity. To carry this to its limit, a solid gel can be obtained with as little as about 1 percent by weight of some of these products in solution where a proper balance of interacting moieties have been maintained. A high ratio of amide to carboxyl groups can be obtained by carrying out the reaction at a low temperature around minus 10 degrees centigrade. By increasing the reaction temperature to plus 30° C., the ratio of amide to carboxyl moieties in the final product is reversed. A second method of controlling the solution viscosity of the product without resorting to changes in molecular weight is to replace some of the sodium atoms on the carboxyl groups with hydrogen atoms, thus increasing the interaction between substituents on neighboring chains to cause a corresponding increase in viscosity.

Still a further advantage of preparing either carboxy methyl cellulose or the mixed ethers using this process is that the efficiency of the substitution reaction is very high, such that essentially fiber-free water solutions of the product result from as little as three moles of alkali and two moles of monohaloacetonitrile. Current methods of preparing fiber-free water solutions of carboxy methyl cellulose, in contrast, require at least four moles of monochloroacetic acid and eight moles of alkali.

In the etherifying reaction the reactants can be, if desired, added together and the reactions conducted without any necessity of adding a solvent. Further, the order of addition of the reactants can be reversed such that the alkali is added first with the cellulose, and then the monohalonitrile is added. The reactions can be conducted in solution or slurry as in the presence of an inert or non-reactive carrier solvent, liquid at reaction conditions. Exemplary of suitable carrier solvents are monohydric secondary or tertiary alcohols, e.g., isopropyl alcohol, t-butyl alcohol, 2-ethylbutyl alcohol, sec.- or tert.-octyl alcohol, sec.- or tert.-cetyl alcohol, allyl alcohol and the like.

The reactions that occur, wherein Cell—ONa is representative of sodium alkali cellulose obtained by reaction of cellulose and sodium hydroxide reactant, can be represented in stepwise fashion as follows:

Cyanomethylation reaction:

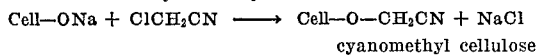
cyanomethyl cellulose

Partial hydrolysis:

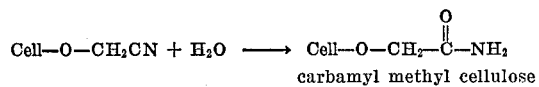
carbamyl methyl cellulose

Full hydrolysis:

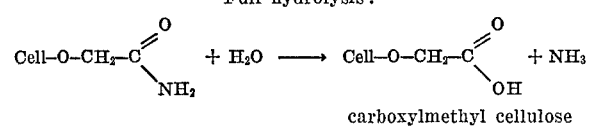
carboxylmethyl cellulose

Novel compositions are formed in accordance with reactions conducted in the unique process of this invention, these compositions comprising water-soluble mixtures of cyano, amino and carboxyl derivatives of the cellulose, and the reaction mixtures that are produced possess good suspending, thickening and stabilizing properties, and are suitable for use as plastics, films and coatings as is carboxy methyl cellulose. Preferred mixtures of the water-soluble derivatives of this type comprise from about 0 to about 2.0 percent by weight of cyanomethyl cellulose and from about 0.05 percent to about 26 percent by weight of carbamylmethyl cellulose. In such mixtures the carboxy methyl cellulose is preferably from about 10 percent to about 35 percent by weight of carboxymethyl cellulose, with the balance of the water-soluble derivatives being made up to cyanomethyl cellulose and carbamylmethyl cellulose. In such mixtures it is found that the degree of substitution of the cyanomethyl cellulose ranges generally from about 0 to about 0.1, the degree of substitution of the carbamylmethyl cellulose ranges generally from about 0.0015 to about 1.0, and the degree of substitution of the carboxy methyl cellulose ranges generally from about 0.38 to about 1.45. An advantage of using these mixtures of water-soluble cyano, amino and carboxyl derivatives as contrasted with essentially pure carboxy methyl cellulose is that it is easy to control the viscosity of the solution by adjustment of the hydrogen ion concentration. By proper adjustment of the pH or hydrogen ion concentration, a solution containing as little as 1 percent by weight of this solid product can be caused to form an essentially immobile gel.

It is quite surprising that monohaloacetonitrile has proven such an outstanding etherifying agent in the cyanomethylation reaction with alkali cellulose, and that the resulting reaction should prove so admirably suitable for the production of water-soluble derivatives. As suggested, e.g., acrylonitrile has been reacted with alkali cellulose to produce cyanoethyl cellulose with a moderately high degree of substitution—viz, about 1.0 to 1.2—but water-soluble derivatives have not been obtained. While applicant does not desire to be bound by a specific theory of mechanism, nonetheless as a result of considerable investigation, study, and experimentation, it is believed that the outstanding effectiveness of the monohaloacetonitrile in its role as an etherifying agent for the production of water-soluble derivatives of cellulose can be explained. The reaction is thus believed to occur through a nucleophilic attack by the hydroxyl oxygen of the cellulose on the α-carbon of the monohaloacetonitrile. The reaction is believed to involve a displacement of the α-halogen atom by the entering nucleophile (a negative species seeking the positive nucleus of the reacting α-carbon), the reaction being enhanced by the electron withdrawing characteristics of the nitrile group which produces a positive charge on the α-carbon and thus makes it a better electrophile, or proton acceptor. In contrast, the monochloropropionitrile, on the one hand, is less reactive to cellulose, in the relative sense, bacause its carbon adjacent to the chlorine atom is β to the nitrile group, thus reducing its electrophilicity. On the other hand, the monochloroacetic acid is less reactive than monohaloacetonitrile because the carboxyl group is less effective as an electron withdrawing group than the nitrile group and consequently does not render the α-carbon of the monochloroacetic acid as electrophilic as the α-carbon of the monohaloacetonitrile. Moreover, despite the moderately high degree of substitution obtained with the monochloropropionitrile and the monochloroacetic acid, it would appear that the small size of the nitrile group relative to the amino or carboxyl group along with the strongly polar nature of the nitrile group suppresses its water solubility. Even attempts to hydrolyze the nitrile to the carboxylic acid form has resulted in predominant cleavage of the cyanoethyl group at the ether linkage to form principally acrylonitrile or β hydroxy propionitrile. Fortunately, in the cyanomethylation reaction of the present invention, the reaction of monohaloacetonitrile with cellulose does not undergo a similar hydrolytic cleavage at the ether linkage as might be expected, but rather hydrolysis of the nitrile as a predominant reaction to produce a substituted product rather than a cleavage product.

The practical effect of this is that when either acrylonitrile or chloropropionitrile are reacted with alkali cellulose and attempt is made to hydrolyze the product over to either carbamyl ethyl or carboxy ethyl cellulose, the essential result is that most of the substituted moiety is removed from the cellulose molecules and hence these reagents are rendered ineffective as cellulose modifiers. However, in sharp contrast, if the cyano ethyl cellulose is replaced with another member of the same homologous series but only shorter by one carbon atom, exactly the opposite results are obtained. That is, when the cyano ethyl moiety is replaced by cyano methyl, completely unexpectedly, the hydrolysis of the cyano group not only does not lead to removal of the cyano methyl group from the cellulose chains but the hydrolysis occurs almost simultaneously with the substitution reaction in the presence of the base used to form the alkali cellulose, and the resulting product is either composed of highly substituted carboxy methyl cellulose or largely carboxy methyl cellulose with minor amounts of carbamyl methyl cellulose. Both are highly desired products when water-soluble cellulose derivatives are desired.

The invention will be further illustrated by reference to the following examples which define its more salient features.

The cellulose used to prepare the alkali cellulose, for each of the examples, was purified wood cellulose or purified cotton linters. The monohaloacetonitrile esterifying agent for the cyanomethylation reaction was monochloroacetonitrile of high purity, substantially free from higher chlorinated chloroacetonitriles which produce undesirable cross-linking. Either isopropyl alcohol of technical grade, or no solvent at all, was used in those examples wherein the reaction was conducted in slurry or non-slurry liquid phase. A stainless steel jacketed reactor used for making the dry runs and a jacket was provided through which a water coolant was circulated to maintain the desired reaction temperature. A glass reactor was employed in conducting slurry reactions and the temperature was easier to control. The reaction mixtures of both reactors was stirred during the reactions, and atmospheric pressure was maintained. Air was excluded from the reaction by use of a nitrogen purge.

EXAMPLE 1

In preparation of the alkali cellulose, 22 grams (0.125 mole) of ground cotton linters (cellulose) containing 8 percent equilibrium moisture and 700 ml. of isopropyl alcohol were charged into a stirred glass reactor, and then 36 grams (0.45 mole) of 50 percent sodium hydroxide were added after the air had been removed by bubbling nitrogen through the mixture. The oxygen-free mixture was allowed to stir for 2 hours at room temperature. Then, the temperature of the reaction mixture was lowered to 15° C. and 18.8 grams (0.25 mole) of monochloroacetonitrile were slowly added to the reaction mixture.

The reaction was continued for 3 hours with the temperature maintained between 15 and 20° C. Finally, the temperature was brought to 25° C. and held for 2 more hours. The product was then dumped and the mixture neutralized with acetic acid. The alcohol was removed on a suction funnel and the product dissolved in 300 ml. of water. The product was precipitated by addition of 1000 ml. of isopropyl alcohol and the product was again filtered. This process was repeated 3 times to obtain a salt-free product which was then vacuum-dried at 40° C.

The dried, purified product gave by analysis 2.03 percent nitrogen and, assuming that the nitrogen is all there as the amide, (which may or may not be the case) this gives a DS of approximately 0.250 and the sodium carboxyl substitution of this sample analyzed 0.40 DS. The product was very soluble in water and clear viscous solutions were obtained with as little as 1 percent by weight of the derivatives added to the water.

EXAMPLE 2

In preparation of the cellulose derivative, 22 grams (0.125 mole) of ground cotton cellulose, containing 8 percent moisture, and 700 ml. of isopropyl alcohol were first charged into a stirred glass reactor, while nitrogen was bubbled through the mixture to exclude oxygen. Stirring was initiated and 38 grams (0.50 mole) of chloroacetonitrile were added and mixed well. The reaction mass was allowed to mix 1 hour. Then 40 grams of 25 percent sodium hydroxide in water were added (0.25 mole) with good stirring. The sodium hydroxide was added over a period of 3 hours with the temperature held between 30 and 35° C. Then 30 grams of 50 percent sodium hydroxide in water (0.375 mole) were added over a 2-hour period with the temperature maintained at 30 to 35° C. One hour after all the sodium hydroxide had been added, the reaction mass was then filtered in a funnel and dissolved in water and reprecipitated by adding a minimum of isopropyl alcohol and again filtered. This procedure was repeated 3 times and the product finally placed in a vacuum oven and dried overnight at 40° C. The product, after drying, formed clear viscous water solutions of extremely good clarity. The product analyzed 3.75 percent carbamyl methyl (DS=0.107) and 22.2 percent sodium carboxyl methyl (DS=0.6). One percent by weight dissolved in water gave a viscosity of 360 centipoises.

EXAMPLE 3

Twenty-two grams of purified wood pulp (0.125 mole) and 60 grams (0.75 mole) of 50 percent sodium hydroxide in water were hand mixed and then loaded into a scraped surface reactor equipped with a cooling jacket. The reactor was sealed and evacuated and then swept with nitrogen to remove all air. The temperature of the reaction mass was lowered to 0° C. and 38 grams (0.5 mole) of monochloroacetonitrile were sucked in slowly with good stirring in about 2 hours. After all the nitrile was in, the temperature was gradually increased to 20° C. and held at that temperature for one more hour. The washed and dried product was completely soluble in water with 0.30 DS for the carbamyl methyl and 0.31 DS for the carboxy methyl. The product which was slightly dark colored was washed with sulfuric acid and alcohol solution and again neutralized. This restored the clear color to the viscous water solutions of the product.

A profound advantage of the present invention is that high efficiencies and caustic economies are obtained, as contrasted with prior art processes. Thus, in prior art processes where, e.g., sodium hydroxide is used to produce alkali cellulose, it would be expected that three moles of sodium hydroxide should be added per mole of cellulose because each unit of cellulose has three hydroxyl groups which can accept and react with the sodium hydroxide. As a practical matter it is found necessary, however, to add eight moles of sodium hydroxide per mole of cellulose because most of the sodium hydroxide added to the reaction system is not present in the cellulose matrix wherein it can provide effective collisions, but rather a large part of the sodium hydroxide is dispersed in the solution, Thus, prior art processes require eight moles of sodium hydroxide to form an effecitve reaction system because four moles of the sodium hydroxide are consumed to neutralize acidic carboxyl groups while the other four moles are used in reacting with the halogen, e.g., the chloride of the monochloroacetic acid. Surprisingly, in the process of this invention, starting with a monohaloacetontrile, e.g., monochloroacetonitrile, only a total of 3.5 moles of sodium hydroxide are added for each three moles of the nitrile. This results from the fact that the nitrile hydrolysis to the carboxyl group generates a mole of ammonia which dissolves in the water, the ammonia reacting with the carboxyl groups as they are formed to produce the ammonia salt, thus in effect generating its own requirement for a base. This product is particularly suitable for use in manufacturing detergents. In detergents there is thus a need for ion exchange with metal cations such as calcium and other components to reduce hardness.

It is apparent that certain variations can be made without departing from the spirit and scope of the present invention.

The reactions can thus be conducted in solution or slurry as by the addition of a nonreactive solvent, or the reactions can be conducted without the addition of a solvent in a non-slurry or dry method. Each offers certain advantages, the solution or slurry techniques generally offering better uniformity of products through more uniform contact between the reagents and better heat control. Generally, also, the presence of a diluent tends to favor more hydrolysis of the cyanide group because of solvation effects. Solvents of increasing dielectric constants tend to favor such effect, though temperature has the greatest effect on rate of hydrolysis. The dry or non-slurry method generally offers advantages of economy, faster reaction rates, and minimal amounts of water and reactants need be added to the reaction mixture.

Having described the invention, what is claimed is:

1. A process for the preparation of water-soluble derivatives of cellulose comprising contacting together and reacting a reagent selected from the group consisting of (a) a mixture of cellulose and alkaline hydroxide or (b) alkali cellulose, with a monohaloacetonitrile etherifying agent in molar proportions of monohaloacetonitrile: cellulose ranging from about 2:1 to about 10:1 at temperatures ranging from about −10° C. to about 70° C. and in molar proportions of alkali hydroxide:cellulose ranging from about 2:1 to about 15:1.

2. The process of claim 1 wherein the etherifying agent is monochloroacetonitrile.

3. The process of claim 1 wherein the alkali hydroxide is sodium hydroxide.

4. The process of claim 1 wherein the alkali hydroxide ranges from about 10 to about 73 weight percent in water.

5. The process of claim 7 wherein the reaction is conducted at a temperature ranging from about 10° C. to about 40° C.

6. The process of claim 1 wherein the reaction is conducted in the presence of a carrier solvent.

7. The process of claim 6 wherein the carrier solvent is an alcohol.

8. The process of claim 7 wherein the carrier solvent is a monohydric alcohol.

9. A mixture of water-soluble derivatives of cellulose comprising from about 0 to about 2 weight percent of cyanomethyl cellulose, from about 0.05 to about 26 weight percent of carbamylmethyl cellulose, and from about 10 to about 35 weight percent carboxymethyl cellulose.

10. A mixture of water-soluble derivatives of cellulose comprising cyanomethyl cellulose, carbamylmethyl cellulose and carboxymethyl cellulose, where the degree of substitution of the cyanomethyl cellulose ranges from about 0 to about 0.1, the degree of substitution of the carbamylmethyl cellulose ranges from about 0.0015 to about 1.0, and the degree of substitution of the carboxymethyl cellulose ranges from about 0.38 to about 1.45.

References Cited

UNITED STATES PATENTS

| | | | |
|---|---|---|---|
| 2,824,779 | 2/1958 | Reeves et al. | 260—231 A |
| 3,567,360 | 3/1971 | Pierce et al. | 260—231 A |

OTHER REFERENCES

Chemical Abstracts, Vol. 61, No. 3, Aug. 3, 1964, p. 3018d.

British Rayon and Silk Journal for May 1950, vol. 26, No. 312, pp. 62, 63 and 88.

DONALD E. CZAJA, Primary Examiner

R. W. GRIFFIN, Assistant Examiner

U.S. Cl. X.R.

106—170, 197 CM; 260—231 CM